Dec. 19, 1939.  G. M. DEMING  2,183,710
TEMPERATURE COMPENSATION FOR GAS METERS
Filed Aug. 16, 1937
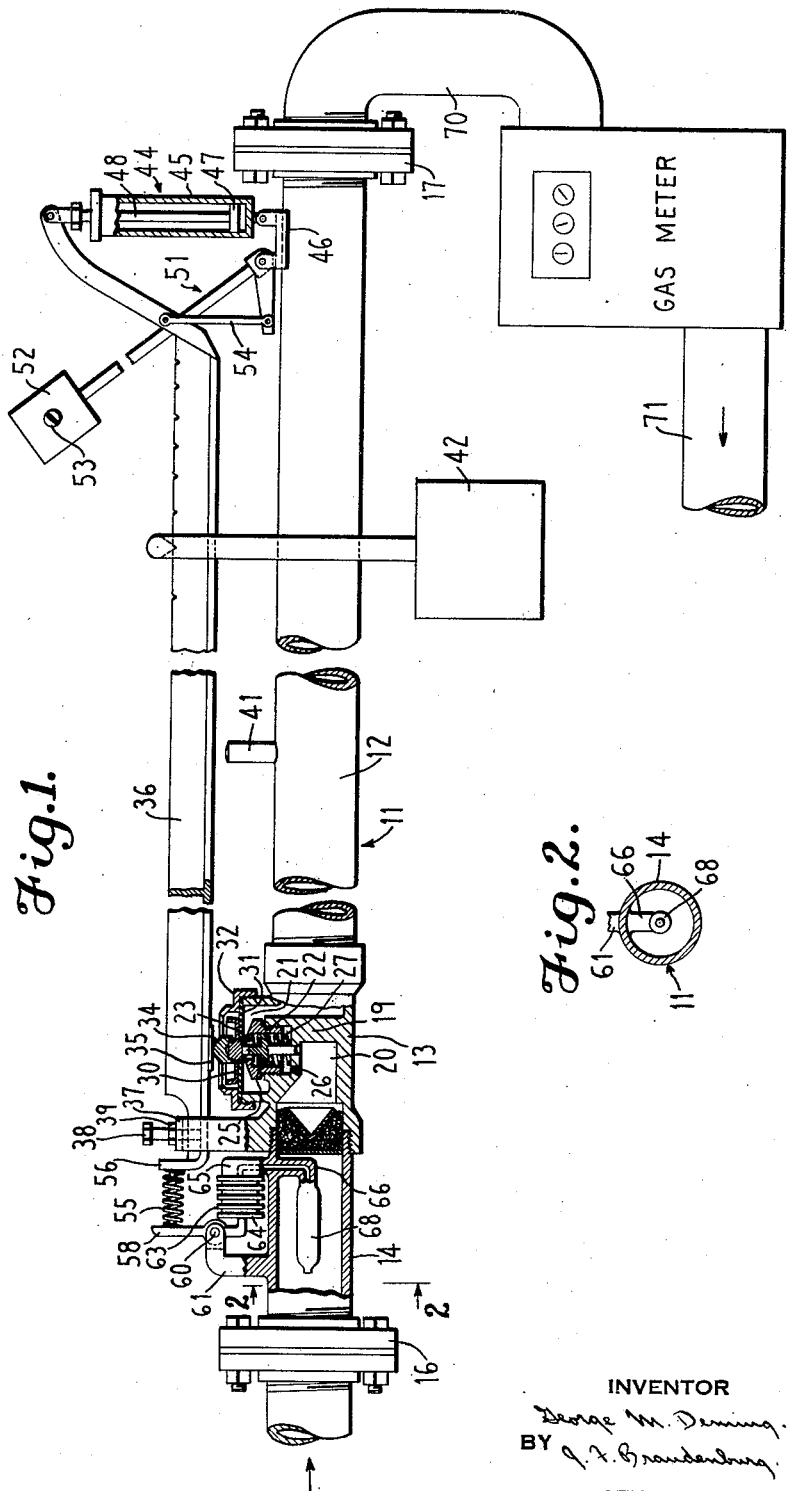
INVENTOR
George M. Deming
BY
ATTORNEY Patented Dec. 19, 1939

2,183,710

UNITED STATES PATENT OFFICE 2,183,710

TEMPERATURE COMPENSATION FOR GAS METERS

George M. Deming, East Orange, N. J., assignor to Air Reduction Company, Incorporated, New York, N. Y., a corporation of New York Application August 16, 1937, Serial No. 159,223

7 Claims. (Cl. 50—17)

This invention relates to the compensation of gas meters for changes in the temperature of the gas.

For measuring the total amount of gas which passes through a pipe line, displacement meters are frequently used which directly measure the volumetric displacement of gas at the temperature and pressure at the meter. Flow-meters, or rate meters, are also employed for this purpose when fitted with some sort of integrating device.

Whichever type of meter is employed, there are three temperatures and three pressures which are involved in interpreting the values registered by the meter. There are the temperature and pressure of the gas passing through the meter, that is, the "flowing temperature" and "flowing pressure" of the gas. Then there are the "calibration temperature" and "calibration pressure", which are the temperature and pressure that would have to be attained by gas passing through the meter in order that the meter readings be correct.

Finally, there are the temperature and pressure which are implied by the figures of metered volume as actually used. These are known as the "base temperature and pressure". For example, if a volume discharged is stated to be 100 cu. ft. at a temperature base of 70° F., and the pressure base is one atmosphere, the implication is that if the gas actually metered were either warmed or cooled as necessary for the temperature to reach 70 degrees and was expanded or contracted as necessary in order to obtain a pressure of one atmosphere, then its actual volume would be 100 cu. ft.

In practice it is usually possible to make the calibration pressure and temperature equal to the base pressure and temperature by design or adjustment of the meter. However, for accurate results it is always necessary to correct the value indicated by the meter for flowing temperature and pressure variations. In order to avoid the computations necessary for these corrections, devices have been designed for automatically correcting the meter readings for temperature and pressure. However, these devices are complicated and expensive.

It is an object of this invention to provide improved means for compensating for changes in the temperature of the gas flowing through a meter.

As the temperature of a gas rises it is necessary to raise the pressure also in order to obtain the same mass of gas in a given volume. In accordance with this invention the pressure of the gas flowing through a meter is raised or lowered with the temperature and in such relation to the temperature variation that the mass of gas per unit of volume remains unchanged, and the accuracy of the meter readings remains unchanged. It may be said that another object of the invention is to vary the gas pressure in a meter supply line automatically in such relation to temperature variations that the accuracy of meter readings is not affected by the temperature changes.

The invention includes a pressure regulator which receives gas at high pressure and delivers it at reduced pressure to the gas line in which the meter is located. The pressure regulator is set to give the desired delivery pressure at a certain mean temperature. When the gas temperature rises above or falls below that mean, the regulator automatically increases or decreases the pressure to an extent which compensates for the change in temperature of the gas measured by the meter. In practice it is sufficient to vary the pressure delivered by the regulator by 5 or 6% from the mean level for most temperature variations that are encountered. Inasmuch as these variations for the most part are from summer to winter rather than abrupt variations during a single day, the slight variation in delivery pressure does not interfere with any normal welding, cutting, or other industrial operations for which the gas is used.

The temperature-sensitive feature of the pressure regulator is obtained by simple apparatus in the regulator, whereas apparatus in the meter for correcting readings when gas is supplied from an ordinary regulator is complicated and expensive.

Other objects, features, and advantages of the invention will appear or be pointed out as the specification proceeds.

In the drawing:

Fig. 1 is a side elevation, partly in section, showing the preferred embodiment of the invention.

Fig. 2 is a sectional view taken on the line 2—2 of Fig. 1.

The regulator shown in Fig. 1 has a body 11 comprising a pipe 12 threaded into one side of a valve fitting 13, and a nipple 14 threaded into the other side of the valve fitting. The regulator body 11 has a union 16 at one end for connecting the regulator with a supply conduit and a union 17 at the other end for connection with a gas delivery line. The gas may come from a bank of high-pressure cylinders through a primary regulator (not shown) which keeps the inlet pressure of the regulator shown herein to a fairly narrow range while the cylinder pressure declines from a high value to the pressure at which the cylinders must be shut off. The instant regulator may serve as the second stage of a compound regulator, or as the second of two regulators in series, if the original source pressure has a widely declining range, or it may serve without any first-stage regulator if the high pressure of the source stays within reasonable limits. Thus, the regulator may be fed directly from a compressor.

A partition wall 19 divides the interior of the valve fitting 13 into a high-pressure chamber 20 and a reduced-pressure chamber 21. The partition wall 19 has an upper portion with a threaded recess, into which is screwed a thimble 22 having a port surrounded at its lower end by a lip 23 which serves as a valve seat. A valve element 25 with an axially-grooved periphery slides in the thimble 22 as a guide and coacts with the lip 23 to control the passage of gas from the valve chamber into the low-pressure chamber 21. The high-pressure chamber 20 communicates with the valve chamber through passages 26.

The valve element 25 is urged against the lip 23 by a spring 27. A stem extends upward from the valve element and into contact with the center of a plate 30 which is secured to a diaphragm 31. The diaphragm is clamped against the upper end of the valve fitting by an annulus 32 threaded on the upper end of the valve fitting.

The plate 30 has a central hub on which rests a block 34 which presents a pointed conical bearing for a concave surface on a lever 36 near its fulcrum, this surface being preferably provided by a piece 35 fastened to the under side of the lever. The force exerted by the lever 36 tends to flex the diaphragm 31 downward against the combined upward force of the spring 27 and the gas pressure in the reduced-pressure chamber 21.

A bracket 37 extends upward from the valve fitting 13 and over the end of the lever 36. The lever 36 is preferably of T section, and screws 38, threaded through the bracket 37, engage recesses in the side flanges of the lever. These screws are the fulcrum for the lever, and are locked by nuts 39.

An abutment 41 on the top of the pipe 12 limits the downward movement of the lever 36. A weight 42 is slidable along the lever 36 and can be set at greater or less distances from the fulcrum to adjust the regulator for higher or lower delivery pressures, as desired.

A dash-pot 44 is connected to the end of the lever 36 to prevent sudden movement of the lever and to keep the regulator from "hunting". The dash-pot 44 has a cylinder 45 pivoted to a bracket 46 on the pipe 12. A piston 47 in the cylinder has a piston rod 48 pivoted to the end of an extension of the lever 36.

In order to prevent a drop in the delivery pressure of the regulator as the demand rate increases and the valve element 25 moves further from its seat 23, the downward force of the lever 36 against the diaphragm 31 must increase. This result is obtained by means of a compensator comprising a bell-crank 51 pivoted to the bracket 46 and having a weight 52 slidable on its longer arm and fastened in set position by a set-screw 53. The shorter arm of the bell-crank 51 is connected to the lever 36 by a link 54. The weight 52 acts to move the lever 36 downward and adds its force to that of the weight 42 on the lever 36. As the valve element 25 opens wider and the lever 36 moves downward, the bell-crank arm supporting the weight 52 moves further from a vertical position and increases the effective lever arm through which the weight 52 acts. The compensator can be designed to cause the delivery pressure of the regulator to increase as the demand rate increases, and if this increase in delivery pressure is made substantially proportional to the additional line drop as the rate of flow increases, the gas pressure at a torch or other equipment down the line or at the meter can be held substantially constant with variation in demand.

The load on the lever 36 is increased by a spring 55 which thrusts against a bell crank arm 56 upstanding from one end of the lever. A small lever 58 holds the spring 55 against the arm 56. This small lever 58 is supported by a pivot 60 carried on a bracket 61 secured to the regulator body.

A metallic bellows 63 has a plate 64 at one end which bears against the lower arm of the small lever 58. The other end of the bellows is connected to a bracket 65 on the regulator body. Another bracket 66 directly under the bracket 65 extends inward from the wall of the regulator body and supports a capsule 68 in position where it will have contact with the stream of gas flowing into the regulator. The capsule 68 is filled with liquid such as toluene or propane and there is a passage through the brackets 65 and 66 through which the interior of the capsule 68 is in communication with the bellows 63.

The capsule 68, being in the gas stream, acquires the same temperature as the gas. Changes in the temperature of the capsule cause the liquid within the capsule to expand or contract and move the bellows 63 which moves the small lever 58 in a direction to increase the compression of the spring 55 when the temperature of the gas rises. When the gas temperature drops, the bellows shortens and the spring 55 expands, reducing the load on the lever 36.

The movement of the bellows 63, the length of the arms of the lever 58, and the strength of the spring 55 are so proportioned that the change in the loading imposed on the lever 36 by the pressure of the spring 55 causes the delivery pressure of the regulator to increase with the temperature at such a rate that unit volumes of gas contain the same mass of gas at the different temperatures. The actual values for the bellows, lever, and spring sizes can be computed by one skilled in the art after the constants of the regulator are known.

Gas from the regulator flows through a pipe 70 to a gas meter and from the gas meter to a delivery line 71. In order to prevent an increase in demand rate from causing a pressure drop at the meter, the weight 52 must be adjusted to hold the pressure constant at the meter, but the temperature compensating features of this invention can be incorporated in regulators having no apparatus for preventing a pressure drop as the demand rate increases. The theory of the pressure compensating apparatus comprising the weight 52 and the linkage that moves it is explained in Patent No. 2,048,379 issued July 21, 1936, to James Hamilton.

Although illustrated in a dead-weight regulator, it will be understood that this invention is not limited to such regulators but may be applied to other regulators having spring loaded diaphragms or diaphragms loaded principally by gas pressure. Some features of the invention can be used without others.

I claim:

1. In a pressure regulator which receives gas at high and variable pressure and delivers it at a reduced and substantially constant pressure, a chamber through which the gas flows, a temperature-responsive device in said chamber in position to be influenced by the temperature of the gas flowing through the chamber, a valve for controlling gas flow through the regulator, a diaphragm operatively connected with the valve, apparatus loading the diaphragm, compensating apparatus outside of said chamber, and a conduit through which the temperature-responsive device is connected to said compensating apparatus by a fluid column, the compensating apparatus including means responsive to the fluid column and constructed and arranged to change the loading of the diaphragm in the direction to cause an increase in the delivery pressure of the regulator in response to increase in the temperature of the gas.

2. Pressure regulator apparatus including a passage for gas at high pressure, a reduced pressure chamber, a valve element for controlling the supply of gas from said passage to said reduced pressure chamber, a diaphragm exposed to the pressure in said chamber, means loading said diaphragm and acting against the pressure in said chamber, said means acting in a direction to urge the valve element into open position, a temperature-responsive element in the passage where it is heated or cooled by the high pressure gas before it reaches the valve element, and apparatus outside of the high pressure gas passage and actuated by the temperature-responsive element for increasing the loading on the diaphragm as the temperature of the gas increases.

3. A dead weight pressure regulator including a diaphragm exposed on one side to the gas pressure in a reduced pressure chamber, a beam loading the diaphragm and urging it to move against the pressure in said chamber, a valve element controlling the supply of gas to said chamber and movable into open position under the influence of the force of said beam, a weight on said beam movable into different positions to control the force of the beam against the diaphragm, and means increasing the load exerted by the beam in accordance with increases in the temperature of the gas.

4. The combination in a pressure regulator having a reduced pressure chamber, a valve element controlling the supply of gas to said reduced pressure chamber, and valve-closing means which move the valve element into closed position when the pressure in said chamber exceeds a given value, of apparatus responsive to the displacement of the valve element and adapted to cause the valve-closing means to operate at a higher pressure when the valve element moves into wide open position, and other apparatus responsive to the temperature of the gas and adapted to cause the valve-closing means to operate at higher pressure as the temperature of the gas supplied to the regulator increases.

5. The combination with a gas meter, of a pressure regulator on the upstream side of the meter, said regulator including a high pressure chamber, a reduced pressure chamber, a valve controlling the supply of gas from the high pressure chamber to the reduced pressure chamber, means including a diaphragm subject to gas pressure in the reduced pressure chamber for causing the valve to close and shut off further flow of gas when the pressure in said reduced pressure chamber reaches a given value, means loading the diaphragm with force that opposes the force exerted against the diaphragm by the gas in the reduced pressure chamber, apparatus responsive to the displacement of the valve with changes in the demand rate for varying the loading force on the diaphragm in a manner to cause increase in the delivery pressure of the regulator by an amount equal to the increased pressure drop produced by the greater flow in the line from the regulator to the meter, and other apparatus responsive to changes in temperature of the gas for varying the loading force on the diaphragm in a manner to cause the delivery pressure to rise and fall with the temperature at a rate which substantially compensates for changes in the density of the gas.

6. In a pressure regulator, a valve element, pressure-responsive means for operating the valve element including a diaphragm and means loading the diaphragm, a temperature-sensitive device in a chamber of the regulator in position to be heated and cooled by gas which flows through said regulator, and apparatus located outside of said chamber, but connected with and operated by said temperature-sensitive device to change the loading on said diaphragm.

7. In a pressure regulator having a reduced pressure chamber, a valve element controlling the supply of gas into said chamber, means for operating the valve element including a diaphragm exposed to the pressure of the gas in said chamber, and means loading the diaphragm against the gas pressure, the improvement of a spring included in said loading means, a lever movable to change the tension of said spring and the consequent loading of the diaphragm, a bellows in such relation to the lever that expansion of the bellows moves the lever in a direction to increase the force of the spring against the diaphragm, a capsule in position to be heated and cooled by the gas that flows through the regulator, and a passage connecting the interior of the capsule and the bellows so that fluid expanding or contracting in the capsule operates the bellows.

GEORGE M. DEMING.